United States Patent [19]
Akamatsu et al.

[11] Patent Number: 5,701,762
[45] Date of Patent: Dec. 30, 1997

[54] APPARATUS FOR RECOVERING HIGH-BOILING POINT SOLVENTS

[75] Inventors: Mikio Akamatsu; Kenji Seki, both of Shizuoka; Katsuhiro Yamashita, Kanagawa; Takeya Kobayashi, Tokyo; Takashi Taniguchi, Kanagawa, all of Japan

[73] Assignees: Nichias Corporation; Toho Chemical Engineering and Construction Co., Ltd., both of Tokyo, Japan

[21] Appl. No.: 771,160

[22] Filed: Dec. 20, 1996

[30] Foreign Application Priority Data

Dec. 21, 1995 [JP] Japan .................. HEI. 7-333344

[51] Int. Cl.$^6$ .................................................. F25J 1/00
[52] U.S. Cl. ................... 62/636; 62/94; 95/120; 95/125; 96/123; 96/125; 96/130; 96/144
[58] Field of Search .................... 62/94, 272, 617, 62/636, 641; 165/8; 95/120, 125; 96/123, 125, 130, 144

[56] References Cited

U.S. PATENT DOCUMENTS

| | | | |
|---|---|---|---|
| 4,650,575 | 3/1987 | White, Jr. .................. | 210/183 |
| 4,846,855 | 7/1989 | Tsujimoto .................. | 55/60 |
| 5,242,473 | 9/1993 | Ogasahara .................. | 96/125 |
| 5,584,916 | 12/1996 | Yamashita et al. .......... | 96/123 |

FOREIGN PATENT DOCUMENTS

WO-91/16971  11/1991  WIPO.

*Primary Examiner*—Ronald C. Capossela
*Attorney, Agent, or Firm*—Cushman Darby & Cushman IP Group of Pillsbury Madison & Sutro LLP

[57] ABSTRACT

Apparatus for recovering high-boiling point solvents which comprises: a honeycomb-structured rotor 1 having an adsorbent supported thereon; a separator 3 for partitioning the neighborhood of each end face of the rotor into two regions, adsorption zone 5 and desorption zone 4; fan means $F_1$ that supplies the adsorption zone 5 with air containing a solvent boiling at 150° to 300° C. and which causes part of the clean gas effluent a from the opposite end face of the rotor to be released into the air atmosphere while the remainder is supplied into the desorption zone 4; heating means H for heating the clean gas; cooling means C for separating a solvent enriched gas S into a liquefied product L to be recovered and a cooled lean gas V; and return means $F_2$ for turning the cooled lean gas V back to the feed gas.

8 Claims, 4 Drawing Sheets

APPARATUS FOR RECOVERING HIGH-BOILING POINT SOLVENTS

BACKGROUND OF THE INVENTION

The present invention relates to an apparatus capable of efficient and continuous recovery of high-boiling point solvents from exhaust gases of plant and other origins that contain such solvents.

At the end of 1995, chlorine-based solvents such as 1,1,1-trichloroethane and Flon 113 were cut back totally. As alternatives to these chlorine-based solvents, low-boiling point solvents such as methanol, ethanol and methyl ethyl ketone, and high-boiling point solvents such as N-methyl-2-pyrrolidone (NMP), cyclohexanone ketone and high-flash point hydrocarbons are used commercially. The high-boiling point solvents are safer than the low-boiling point solvents which have a potential fire hazard due to low flash points; on the other hand, the high-boiling point solvents are difficult to dry after washing or efficient recovery of such solvents is an objective that need be addressed from an industrial viewpoint.

Conventionally, high-boiling point solvents are recovered by direct cooling of exhaust gases containing such solvents. However, a huge energy is required to ensure solvents boiling at about 150° to 300° C. are condensed almost completely by means of cooling alone. Consider, for example, NMP; this solvent has a saturation concentration of about 400 ppm in air at 20° C. and in order to achieve more than 90% condensation by means of cooling alone, it must be cooled to −10° C. but this is not practical. Another approach is by adsorption on activated carbon and the like but this is mostly limited to the recovery of low-boiling point solvents for two reasons: first, steam used as a heat source for desorption has such a small desorption capacity that regeneration of the adsorbent tends to be insufficient; secondly, the activated carbon which is inflammable cannot be subjected to desorption at elevated temperatures and, hence, insufficient regeneration will result. Thus, no suitable methods have been developed that are capable of efficient and continuous recovery of high-boiling point (ca. 150° to 300° C.) solvents from exhaust gases containing such solvents.

A rotary organic solvent vapor adsorbing apparatus is known and it uses a honeycomb structure comprising an adsorbent such as ceramic or activated carbon supported thereon; an exhaust gas containing an organic solvent is supplied continuously into the honeycomb structure at one end and clean air is produced at the other end (PCT International Publication 91/16971 and Japanese Patent Application Laid-open No. Hei 7-75714).

The rotary adsorbing apparatus will now be described with reference to FIG. 4(a). As shown in FIG. 4(a), corrugated and uncorrugated sheets chiefly made of ceramic fibers or the like are wound on themselves in a roll form as they are superposed alternately on each other and a suitable adsorbent is supported on the surfaces of the sheets to make a honeycomb-structured rotor 1, which is rotated about the center of the roll. The tubular air passageways formed by the corrugated sheets extend through the rotor 1 in its longitudinal direction. If air to be treated A is forced into these passageways by means of a fan $F_1$, the organic solvent vapor in the air is adsorbed on the adsorbent on the rotor 1, with clean air a coming out at the other end of the rotor. The air to be treated A is not supplied into all of the air passageways through the rotor but a separator 3 is provided near an end face 2 of the rotor at which these passageways are open (another separator is coaxially provided near the other end face of the rotor) such that a regeneration (desorption) zone 4 is formed as sectional region separate from a treatment (adsorption) zone 5. Regenerating heated air R rather than the air to be treated A is supplied into the regeneration zone 4 by means of a fan $F_2$. When the adsorbent that has adsorbed the organic solvent enters the regeneration zone 4 as the result of the rotation of the rotor 1, the adsorbent is heated with the regenerating air R to desorb the organic solvent and reclaimed exhaust gas S containing the desorbed organic solvent vapor emerges from the other end face of the rotor 1. In this way, the adsorption of the organic solvent in the treatment zone 5 which is supplied with the air to be treated A concurs with the regeneration of the adsorbent in the regeneration zone 4 throughout the operation of the adsorbing apparatus, which therefore exhibits consistent performance in the treatment of the air A.

FIG. 4(b) shows an improved version of the rotary adsorbing apparatus shown in FIG. 4(a). A separator 6 partitions the rotor 1 into three regions, the treatment zone 5, the regeneration zone 4 and a purge zone 7, and the purge zone is cooled with ambient air such as to enhance the ability of the adsorbent to adsorb the organic solvent in the adsorption zone.

A problem with the rotary organic solvent vapor adsorbing apparatus described above is that since the treated clean gas which has passed through the adsorption zone of the honeycomb-structured rotor having the adsorbent supported thereon is directly released into the air atmosphere, heat loss is inevitable. In addition, the above-described apparatus of interest is primarily concerned with the production of clean air and it does not disclose any specific means of recovering solvents, particularly those which boil at 150° to 300° C.; hence, it is not clear whether the apparatus under consideration is suitable for the recovery of such solvents.

SUMMARY OF THE INVENTION

An object, therefore, of the invention is to provide an apparatus for recovering high-boiling point solvents that utilizes the above-described rotary organic solvent vapor adsorbing apparatus, that is particularly effective for efficient recovery of high-boiling point (150° to 300° C.) solvents and that is also capable of reducing the emission of solvents into the air atmosphere.

Under the circumstances described above, the present inventors conducted intensive studies on the utilization of the rotary organic solvent vapor adsorbing apparatus described in Japanese Patent Application Laid-open No. Hei 7-75714, supra, for the purpose of recovering high-boiling point (150° to 300° C.) solvents. As a result, they found that heat loss could be prevented while achieving not only reduced solvent emission into the air atmosphere but also efficient recovery of the high-boiling point solvents by taking the following steps: part of the clean air produced by the treatment with the adsorbent is not immediately released into the air atmosphere but heated for use in desorption, and the solvent enriched gas obtained by desorption is cooled so that it is separated into a liquefied product and a cooled lean gas, the latter being returned to the initial feed of the air to be treated. The present invention has been accomplished on the basis of this finding.

The present invention provides an apparatus for recovering a high-boiling point solvent which comprises: a rotor comprising, a honeycomb structure having an adsorbent supported thereon, a rotational axis, tubular air passageways extending therethrough parallel to the rotational axis and first and second end faces; drive means for driving the rotor; a separator comprising radially arranged plate members provided in a face-to-face relationship with the first and second end faces of the rotor for partitioning the neighborhood of each of the rotor end faces into a adsorption zone and a desorption zone; fan means for supplying air containing a high-boiling point solvent boiling at 150° to 300° C. to the first end face of the absorption zone, for releasing a part of a clean gas effluent from the second end face of the rotor to an air atmosphere, and for supplying a remainder of the clean gas is supplied into the desorption zone subsequent to the adsorption zone in the direction of the rotation of the rotor; heating means installed behind the fan means for heating the remainder of the clean gas; cooling means for separating the solvent enriched gas effluent from the desorption zone of the rotor into a liquefied product to be recovered and a cooled lean gas; and return means for mixing the cooled lean gas with the high-boiling point solvent containing air.

The invention also provides an apparatus for recovering a high-boiling point solvent which comprises: a rotor comprising, a honeycomb structure having an adsorbent supported thereon, a rotational axis, tubular air passageways extending therethrough parallel to the rotational axis and first and second end faces; drive means for driving the rotor; a separator comprising radially arranged plate members provided in a face-to-face relationship with the first and second end faces of the rotor for partitioning the neighborhood of each of the rotor end faces into a adsorption zone, a desorption zone and a purge zone; fan means for supplying air containing a high-boiling point solvent boiling at 150° to 300° C. to the first end face of the absorption zone, for releasing a part of a clean gas effluent from the second end face of the rotor to an air atmosphere, and for supplying a remainder of the clean gas is supplied into the purge zone subsequent to the adsorption zone in the direction of the rotation of the rotor; heating means for heating the remainder of the clean gas fed from the purge zone; cooling means for separating the solvent enriched gas effluent from the desorption zone of the rotor into a liquefied product to be recovered and a cooled lean gas; and return means for mixing the cooled lean gas with the high-boiling point solvent containing air.

DETAILED DESCRIPTION OF THE PREFERRED EMBODIMENTS

Figure 1:
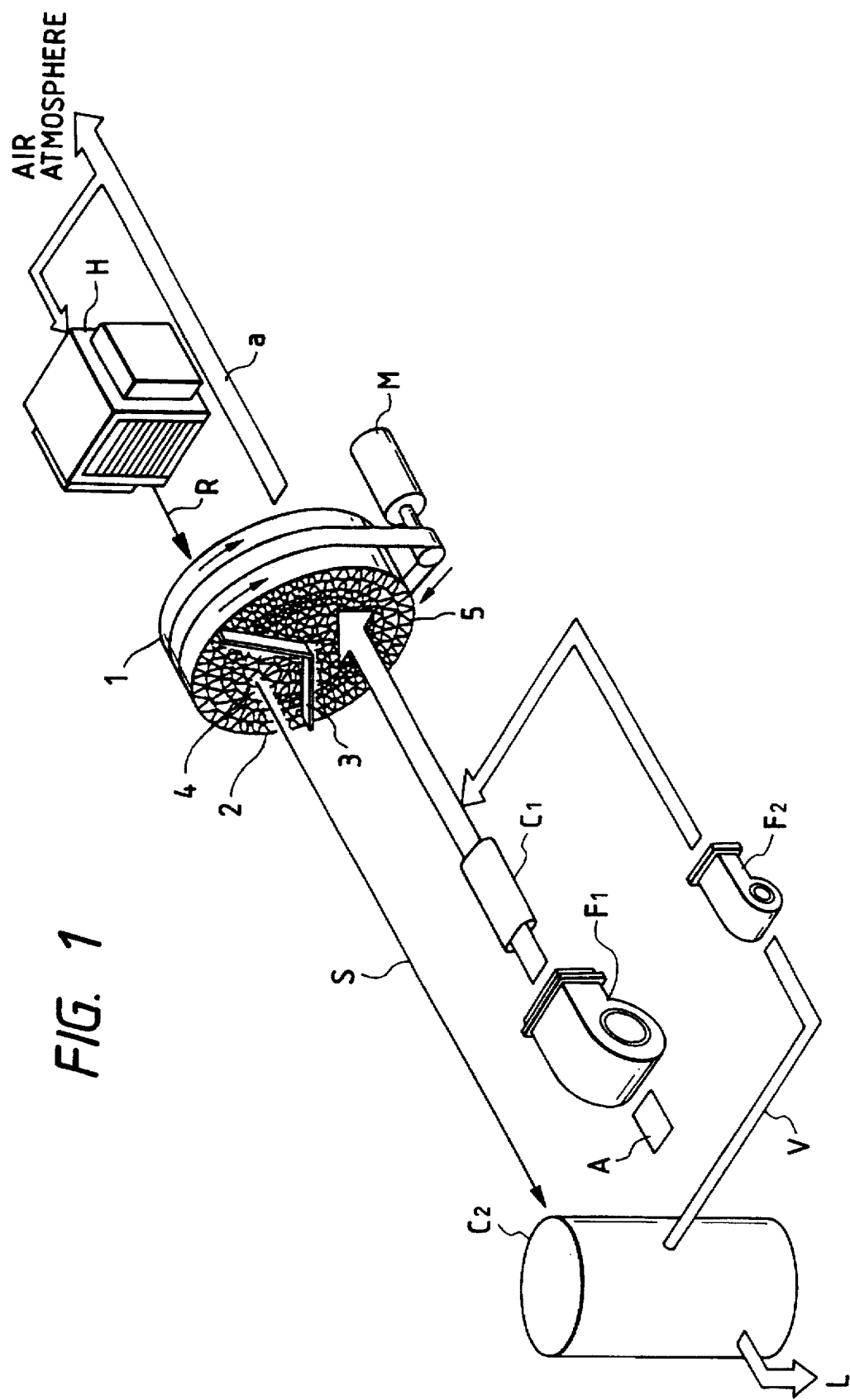
FIG. 1 shows schematically an example of the apparatus of the invention for recovering high-boiling point solvents.

Thus, the solvent recovery system of the invention has the following three characteristic features as compared with the rotary adsorber: the gas to be treated is air containing high-boiling point solvents boiling at 150° to 300° C.; the treated clean air which is conventionally released into the air atmosphere is partly recycled for use as desorbing (regenerating) heated air; and means for liquefying the solvent and recovering the liquefied product is provided such that the separated cooled lean gas is returned to the initial feed of the air to be treated.

The high-boiling point solvents boiling at 150° to 300° C. which are to be used in the present invention include, but are not limited to, N-methyl-2-pyrrolidone (hereunder abbreviated as "NMP"), as well as petroleum- or hydrocarbon-based solvents that boil at 170° to 250° C.

In the invention, part of the treated clean gas is supplied to the desorption zone or to the purge zone if the latter is provided and, as will be mentioned hereinafter, the supply of such treated gas is preferably one tenth to a third ($\frac{1}{10}$ to $\frac{1}{3}$) of the air to be treated. If the treated clean gas is passed through the purge zone of the rotor, its temperature will rise in the meantime by a sufficient amount to reduce the degree of heating required in the subsequent step.

In the present invention, the organic solvent adsorbed on the adsorbent in the adsorption zone is desorbed in the desorption zone by means of a smaller volume of heated air flow than the air to be treated and this contributes to the production of a desorbed exhaust gas containing the vapor of the high-boiling point solvent in a larger amount than the air to be treated. The factor X as a system parameter by which the vapor of the high-boiling point solvent is enriched through an adsorption and desorption cycle is determined by V, or the volume of the air flow to be treated per unit time, and v, or the volume of a desorbing carrier gas flow, and the relationship $X=V/v$ holds. Usually, the system constants and operating conditions are selected in such a way that the enrichment factor X lies between about 5 and about 15.

The preferred size of the desorption zone and the purge zone in the high-boiling point solvent recovery system of the invention is determined not only by the kind and concentration of the organic solvent in the air to be treated but also by other factors including the adsorption/desorption characteristics of the adsorbent used, the desired enrichment factor and the rotational speed of the rotor. Typically, the regeneration zone accounts for about one tenth to a third ($\frac{1}{10}$ to $\frac{1}{3}$) of the area of either end face of the rotor and, if the purge zone is provided, it preferably occupies a comparable area to the regeneration zone or a smaller area not less than a half of the latter.

The adsorbent to be used in the solvent recovery system of the invention is not limited to any particular type as long as it is not flammable and is capable of selective adsorption of the solvent vapor while adsorbing only a limited amount of the water vapor in the air to be treated. A preferred adsorbent is hydrophobic zeolite that has an average pore size of 5 to 13 angstroms and which adsorbs no more than 10 wt % of moisture at a temperature of 25° C. and at a relative humidity of 70%.

The means of cooling the solvent enriched gas effluent from the desorption zone of the rotor in the solvent recovery system of the invention is not limited to any particular types as long as it is capable of separating the enriched gas into a liquefied product and a cooled lean gas; exemplary cooling means include cooling with water or other cooling media and cooling with water is particularly preferred. By such cooling means, almost all of the high-boiling point solvent contained in the solvent enriched gas is condensed and recovered as a liquefied product. If the solvent boils below 150° C., less of the solvent will be condensed by cooling and its concentration in the cooled lean gas will increase. If the solvent boils above 300° C., the solvent enriched gas can be reasonably liquefied merely by cooling it without passage through the recovery system of the invention. The cooled liquefied gas separated from the liquefied product is reverted by a fan or other return means and mixed with the initial feed of the air to be treated such that it is circulated for further use. In this way, the emission of the solvent into the air atmosphere can be effectively controlled.

In the present invention, an additional means is preferably provided for cooling the high-boiling point solvent containing air (i.e., the air to be treated) which is to be supplied to the adsorption zone. This is because efficiency of adsorption in the adsorption zone of the rotor is sufficiently increased. The additional cooling means to be provided is not limited to any particular types but cooling with water is preferred.

EXAMPLES the present invention will now be described in greater detail with reference to relevant drawings. It should, however, be noted that the examples that follow are given there for illustrative purposes only and they are by no means intended to restrict the scope of the invention.

Example 1

Figure 4A:
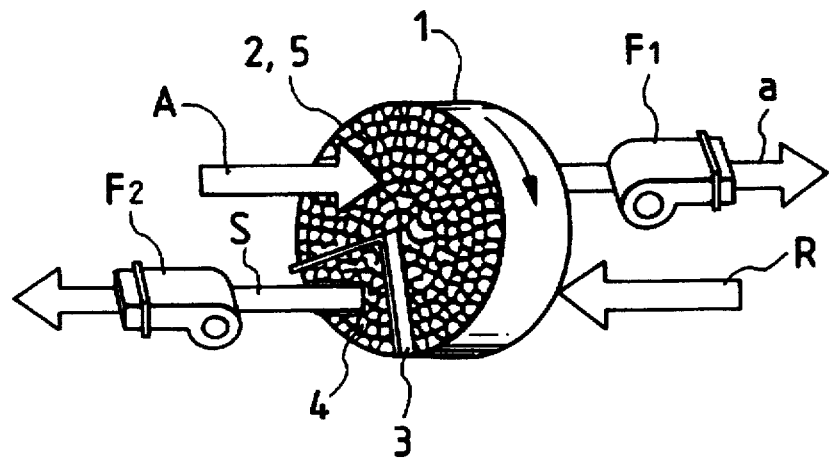
FIG. 4 shows schematically a prior art rotary solvent adsorbing apparatus.
Figure 4B:
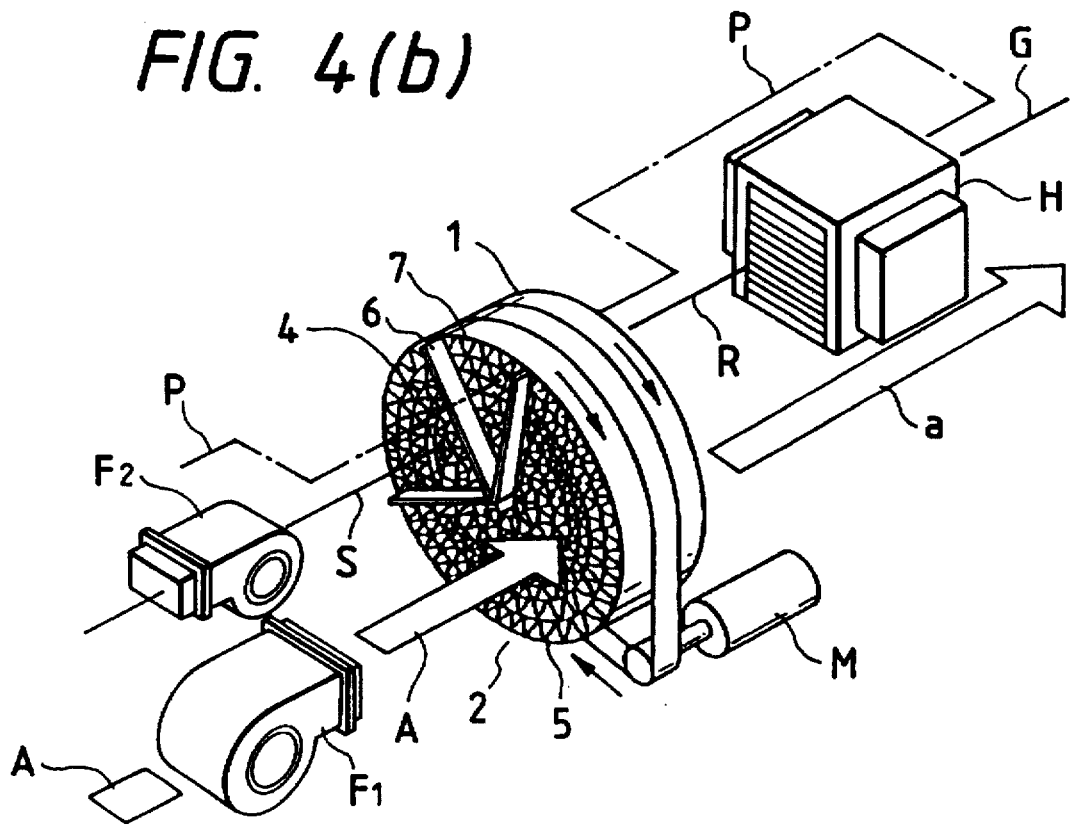

The embodiment of the invention shown in FIG. 1 utilizes the conventional system so far described with reference to FIG. 4(a). Accordingly, the system under consideration comprises a honeycomb-structured rotor 1 having an adsorbent supported thereon, a fan $F_1$ for feeding the adsorption zone 5 of the rotor 1 with the air to be treated A, a cooler $C_1$ for cooling the air to be treated A, heating means H for heating part of the clean gas behind the fan $F_1$ but before it is supplied into the desorption zone 4 of the rotor 1, a cooler $C_2$ for separating an effluent of solvent enriched gas S from the desorption zone 4 into a liquefied product L and a cooled lean gas V, and a fan $F_2$ for returning the cooled lean gas V to be mixed with the air to be treated A. If desired, the fan $F_1$ may be located at such a position that it receives the air that has passed through the adsorption zone 5 of the rotor 1 but that the clean gas a is yet to be branched.

In the system shown in FIG. 1, the honeycomb-structured rotor 1 is driven to rotate by means of a motor M and has hydrophobic zeolite (with an average pore size of 7 Å) being supported thereon as an adsorbent; a separator 3 for preventing the air to be treated from mixing with the desorbing air is provided near both end faces of the rotor 1 at which the air passageways are open. The separator 3 also serves to split the neighborhood of each end face of the rotor 1 into two regions, i.e., the adsorption zone 5 and the desorption zone 4.

The motor M drives the rotor 1 to rotate at 2 to 8 rph (rotations per hour). When the fans $F_1$ and $F_2$, coolers $C_1$ and $C_2$ and the heater H are actuated concurrently, the air to be treated A flows through the air passageways in the adsorption zone 5 of the rotor 1 and the organic solvent in the air A is adsorbed on the adsorbent. The greater part of the clean gas a emerging from the desorption zone 5 is discharged into the air atmosphere but part of it, say, $\frac{1}{10}$ to $\frac{1}{3}$ of the clean gas a is branched and heated by the heater H to a temperature higher than the boiling point of the organic solvent in the air to be treated; the heated clean gas is sent as a desorbing carrier gas R into the desorption zone 4 of the rotor 1. In the meantime, the segments of the rotor 1 that support the adsorbent which has adsorbed the organic solvent enter the desorption zone 4, whereupon the adsorbent is heated by the desorbing carrier gas R to thereby cause the organic solvent to be desorbed from the adsorbent, with a solvent enriched gas S emerging from the rotor 1 to be supplied into the cooler $C_2$.

In the cooler $C_2$, the solvent enriched gas S is cooled so that it is separated into the liquefied product L of the solvent and a cooled lean gas V, with the latter being returned by the fan $F_2$ to mix with the initial feed of the air to be treated A.

Example 2

Figure 2:
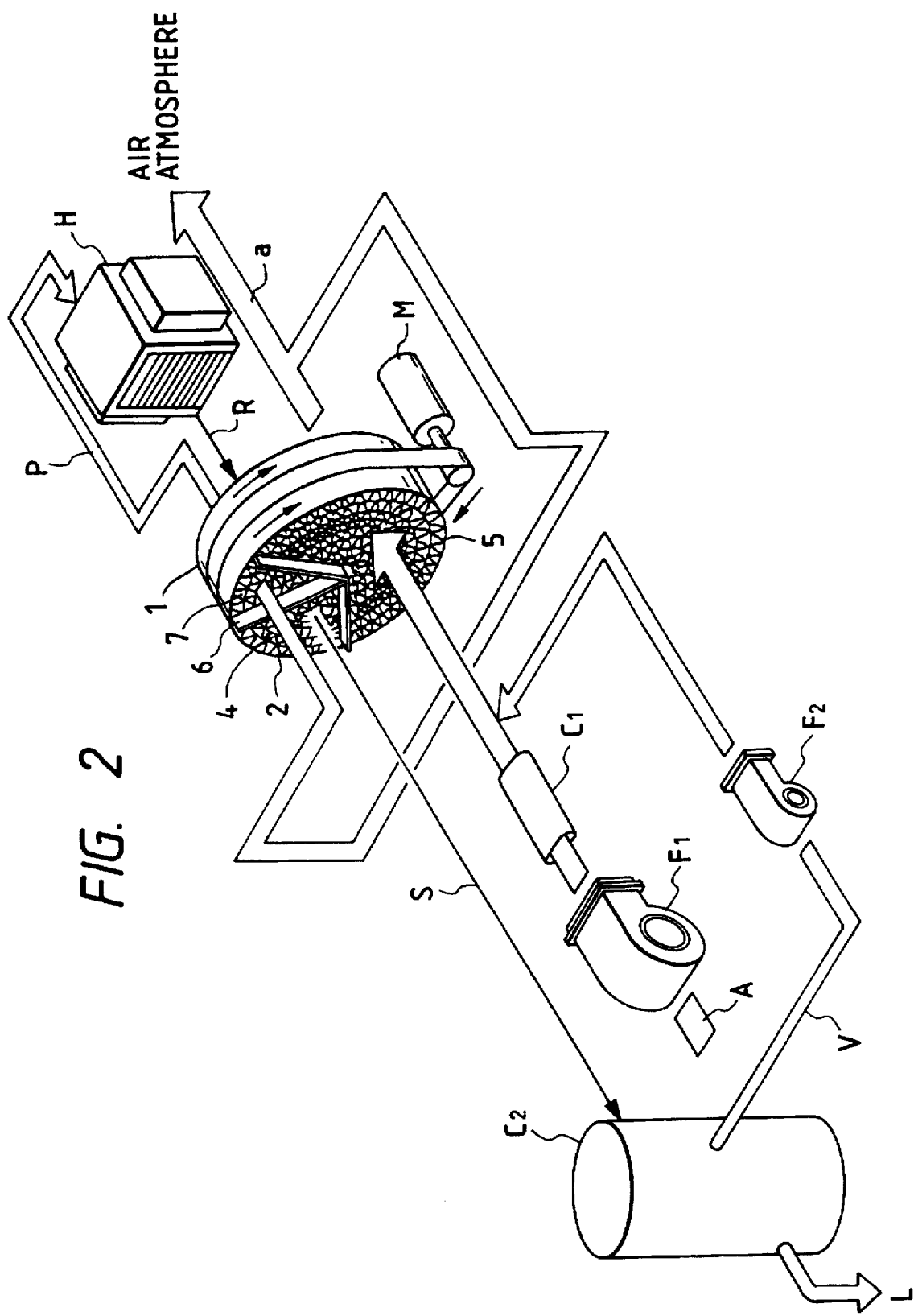
FIG. 2 shows schematically another example of the apparatus of the invention for recovering high-boiling point solvents.

The embodiment of the invention shown in FIG. 2 is constructed as follows: each end face of the rotor 1 is split by a separator 6 into three sectorial regions, i.e., adsorption zone 5, desorption zone 4 and purge zone 7; the hot segments of the rotor 1 are sufficiently cooled with part of the clean gas a when they make a change in position from desorption zone 4 to purge zone 7 as a result of the rotation of the rotor 1 such that those segments will have an enhanced ability to adsorb the solvent in subsequent adsorption zone 5. The clean gas which has cooled the purge zone 7 is subsequently heated with the heater H and sent as a desorbing carrier gas R to the desorption zone 4. The system of Example 2 is otherwise identical to the system of Example 1.

Figure 3:
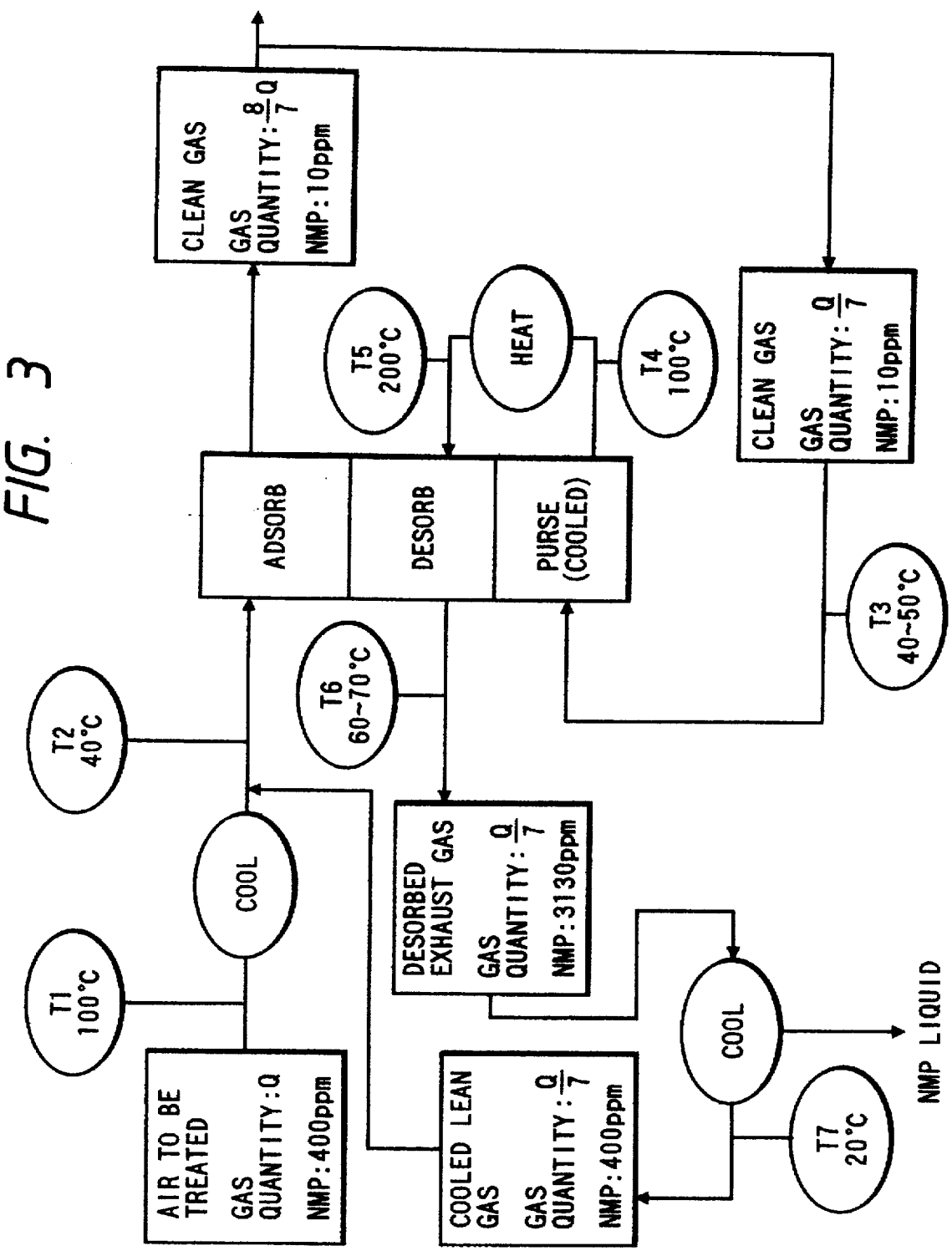
FIG. 3 is a flowsheet for the operation of the apparatus of the invention for recovering high-boiling point solvents.

FIG. 3 is a flowsheet for the operation of the solvent recovery system of Example 2 in the case where NMP having a boiling point of 204° C. is used as a solvent. The gas to be treated is allowed to flow in a quantity of Q $Nm^3/min$. In the flowsheet, $Nm^3/min$ as the unit of gas quantity is omitted.

Referring to FIG. 3, the air to be treated flowing in a quantity of Q (NMP concentration: 400 ppm) has its temperature lowered from 100° C. (T1) to 40° C. (T2) by means of a cooler and combined (mixed) with a cooled lean gas flowing in a quantity of Q/7 before it is admitted into the adsorption zone of the rotor. The clean gas which has been freed of NMP by adsorption (to NMP level of 10 ppm) is mostly (ca. 90%) discharged into the air atmosphere but about 10% of it is sent to the purge zone of the rotor. The clean gas which has cooled the purge zone to undergo a temperature rise to 100° C. (T4) is subsequently heated with a heater so that its temperature rises up to 200° C. (T5). The purge zone is supplied with part of the clean gas which has a temperature of 40° to 50° C. (T3) that is low enough to cool the rotor; on the other hand, compared to the case where ambient air (generally at 10° to 30° C.) is used as the purge gas, the temperature of the clean gas is sufficiently high to reduce the thermal requirement of the heater in the subsequent step. The desorbing carrier gas heats the desorption zone of the rotor to desorb the NMP on the adsorbent, thereby producing a desorbed exhaust gas having a higher concentration of NMP than the air to be treated. The quantity of the desorbed exhaust gas is a fraction ($\frac{1}{7}$) of the air to be treated and the NMP level is accordingly enriched (3130 ppm).

The exhaust desorbed gas having an increased NMP level is cooled so that its temperature which is 60° to 70° C. (T6) is lowered to 20° C. (T7). Upon cooling, the NMP in the gas is reduced from 2700 ppm to about 400 ppm which is a saturation concentration at 20° C. and subsequently mixed as a cooled lean gas with the air to be treated; the remaining NMP is recovered as a liquefied product. In Example 2, part of the clean gas is used as the desorbing carrier gas, so the gas to be supplied into the purge zone of the rotor contains 10 ppm of NMP but this NMP level is insufficient to affect the purging and adsorbing performance of the rotor. In addition, the enriched gas has a higher concentration of NMP than when desorption is performed with the ambient air and, hence, more of the NMP can efficiently be recovered by cooling with the cooler.

According to the present invention, a purge zone may be provided in the rotor in addition to the adsorption and desorption zones and, in this case, the thermal requirement of the heater can be reduced because the gas to be heated has already passed through the purge zone. The organic solvent in the air to be treated is desorbed with a desorbing carrier gas that derives from a small portion of the clean gas and this helps not only increase the concentration of the solvent in the desorbed exhaust gas but also achieve efficient recovery of the solvent having a boiling point of 150° to 300° C. What is more, the cooled lean gas is recycled to mix with the air to be treated and this helps reduce the emission of the solvent into the air atmosphere. As another advantage, the liquefied product of the solvent is obtained by cooling the enriched gas, so it will be contaminated by a comparatively small amount of water.

What is claimed is:

1. An apparatus for recovering a high-boiling point solvent comprising:

a rotor comprising, a honeycomb structure having an adsorbent supported thereon, a rotational axis, tubular air passageways extending therethrough parallel to the rotational axis and first and second end faces;

drive means for driving the rotor;

a separator comprising radially arranged plate members provided in a face-to-face relationship with the first and second end faces of the rotor for partitioning the neighborhood of each of the rotor end faces into a adsorption zone and a desorption zone;

fan means for supplying air containing a high-boiling point solvent boiling at 150° to 300° C. to the first end face of the absorption zone, for releasing a part of a clean gas effluent from the second end face of the rotor to an air atmosphere, and for supplying a remainder of the clean gas is supplied into the desorption zone subsequent to the adsorption zone in the direction of the rotation of the rotor;

heating means installed behind the fan means for heating the remainder of the clean gas;

cooling means for separating the solvent enriched gas effluent from the desorption zone of the rotor into a liquefied product to be recovered and a cooled lean gas; and return means for mixing the cooled lean gas with the high-boiling point solvent containing air.

2. The apparatus for recovering a high-boiling point solvent according to claim 1, further comprising:

means for cooling the high-boiling point solvent to be supplied to the absorption zone.

3. An apparatus for recovering a high-boiling point solvent comprising:

a rotor comprising, a honeycomb structure having an adsorbent supported thereon, a rotational axis, tubular air passageways extending therethrough parallel to the rotational axis and first and second end faces;

drive means for driving the rotor;

a separator comprising radially arranged plate members provided in a face-to-face relationship with the first and second end faces of the rotor for partitioning the neighborhood of each of the rotor end faces into a adsorption zone, a desorption zone and a purge zone;

fan means for supplying air containing a high-boiling point solvent boiling at 150° to 300° C. to the first end face of the absorption zone, for releasing a part of a clean gas effluent from the second end face of the rotor to an air atmosphere, and for supplying a remainder of the clean gas is supplied into the purge zone subsequent to the adsorption zone in the direction of the rotation of the rotor;

heating means for heating the remainder of the clean gas fed from the purge zone;

cooling means for separating the solvent enriched gas effluent from the desorption zone of the rotor into a liquefied product to be recovered and a cooled lean gas; and return means for mixing the cooled lean gas with the high-boiling point solvent containing air.

4. The apparatus for recovering a high-boiling point solvent according to claim 3, further comprising:

means for cooling the high-boiling point solvent to be supplied to the absorption zone.

5. A method for recovering a high-boiling point solvent comprising the steps of:

supplying air containing a high-boiling point solvent boiling at 150° to 300° C. to a first end face of a Absorption zone of a rotor;

releasing a part of a clean gas effluent from a second end face of the rotor to an air atmosphere;

supplying a remainder of the clean gas is supplied into a desorption zone subsequent to a adsorption zone in a direction of a rotation of the rotor;

heating the remainder of the clean gas;

separating the solvent enriched gas effluent from the desorption zone of the rotor into a liquefied product to be recovered and a cooled lean gas; and mixing the cooled lean gas with the high-boiling point solvent containing air.

6. The method for recovering a high-boiling point solvent according to claim 5, further comprising the step of:

cooling the high-boiling point solvent to be supplied to the absorption zone.

7. A method for recovering a high-boiling point solvent comprising the steps of:

supplying air containing a high-boiling point solvent boiling at 150° to 300° C. to a first end face of an absorption zone of a rotor;

releasing a part of a clean gas effluent from a second end face of the rotor to an air atmosphere;

supplying a remainder of the clean gas is supplied into a purge zone of the rotor subsequent to the adsorption zone in a direction of the rotation of the rotor;

heating the remainder of the clean gas fed from the purge zone;

separating the solvent enriched gas effluent from a desorption zone of the rotor into a liquefied product to be recovered and a cooled lean gas; and mixing the cooled lean gas with the high-boiling point solvent containing air.

8. The method for recovering a high-boiling point solvent according to claim 7, further comprising the step of:

cooling the high-boiling point solvent to be supplied to the absorption zone.

* * * * *